US011062096B2

(12) United States Patent
Zhu

(10) Patent No.: US 11,062,096 B2
(45) Date of Patent: *Jul. 13, 2021

(54) DISPLAYING INFORMATION IN MULTIPLE LANGUAGES BASED ON OPTICAL CODE READING

(71) Applicant: Alibaba Group Holding Limited, Grand Cayman (KY)

(72) Inventor: Yifeng Zhu, Hangzhou (CN)

(73) Assignee: ADVANCED NEW TECHNOLOGIES CO., LTD., George Town (KY)

( * ) Notice: Subject to any disclaimer, the term of this patent is extended or adjusted under 35 U.S.C. 154(b) by 93 days.

This patent is subject to a terminal disclaimer.

(21) Appl. No.: 16/189,496

(22) Filed: Nov. 13, 2018

(65) Prior Publication Data

US 2019/0079927 A1 Mar. 14, 2019

Related U.S. Application Data

(63) Continuation of application No. 14/994,099, filed on Jan. 12, 2016, now Pat. No. 10,157,180.

(30) Foreign Application Priority Data

Jan. 13, 2015 (CN) ......................... 201510016728.8

(51) Int. Cl.
*G06F 40/58* (2020.01)
*G06K 7/14* (2006.01)
(Continued)

(52) U.S. Cl.
CPC ............ *G06F 40/58* (2020.01); *G06F 16/338* (2019.01); *G06F 16/3337* (2019.01); *G06K 7/1439* (2013.01)

(58) Field of Classification Search
None
See application file for complete search history.

(56) References Cited

U.S. PATENT DOCUMENTS 6,669,085 B1 * 12/2003 Bergen ..................... H04N 1/00 235/375
6,766,956 B1 7/2004 Boylan, III
(Continued)

FOREIGN PATENT DOCUMENTS

CN 103218137 7/2013
EP 2782060 9/2014
(Continued)

OTHER PUBLICATIONS

Gao et al., "A 2D Barcode-Based Mobile Payment System; 320-329, Jun. 2009", http://www.researchgate.net/profile/Jerry_Gao/publication/221281905_A_2D_Barcode_Based_Mobile_Payment_System/links/54fffc590cf2eaf210bcc149c.pdf, entire document.
(Continued)

*Primary Examiner* — Jonathan C Kim
(74) *Attorney, Agent, or Firm* — Shun Yao; Park, Vaughan, Fleming & Dowler LLP

(57) ABSTRACT

One embodiment of the present invention provides a system for facilitating information in multiple languages based on an optical code. During operation, the system scans an optical code accompanying a text phrase and receives a location of a conversion server embedded in the optical code. The system then determines one or more target languages for obtaining the text phrase in the target languages and sends a query message to the conversion server based on the retrieved location. The query message comprises a list of the one or more target languages.

20 Claims, 10 Drawing Sheets

(51) Int. Cl.
*G06F 16/338* (2019.01)
*G06F 16/33* (2019.01)

(56) References Cited

U.S. PATENT DOCUMENTS 8,308,056 B2 * 11/2012 Millan Marco ..... G06F 16/9537 235/375
8,670,976 B2 * 3/2014 Al-Omari ........... G06F 16/9554 704/8
8,725,490 B2 5/2014 Athsani
8,731,513 B2 * 5/2014 Lemberg ................. G06F 40/58 455/404.1
8,817,959 B1 8/2014 O'Hanlon
9,679,310 B1 * 6/2017 Saltzstein ............... G06F 3/043
2002/0026475 A1 * 2/2002 Marmor ................ G06F 16/258 709/203
2002/0077805 A1 * 6/2002 Hecht ..................... G06F 40/42 704/2
2003/0115552 A1 * 6/2003 Jahnke .................... G06F 40/40 715/201
2003/0186723 A1 * 10/2003 Kim ...................... H04W 8/183 455/558
2004/0078282 A1 4/2004 Robinson
2004/0210841 A1 * 10/2004 Takahashi .......... H04N 1/00464 715/265
2005/0138124 A1 6/2005 Klassen
2006/0065733 A1 * 3/2006 Lee ..................... G06F 16/9554 235/462.01
2006/0285748 A1 * 12/2006 Tateno .................. G06F 40/263 382/181
2007/0016682 A1 * 1/2007 Hodgson ................. H04L 67/34 709/228
2007/0178918 A1 * 8/2007 Shon ................. H04M 1/72436 455/466
2008/0097746 A1 * 4/2008 Tagata .................. G06F 40/263 704/8
2009/0006342 A1 * 1/2009 Wong .................. G06F 16/3337
2010/0159965 A1 6/2010 Pascal
2010/0272193 A1 * 10/2010 Khan .................... H04L 1/1812 375/259
2011/0270751 A1 * 11/2011 Csinger ................... G06F 21/40 705/42
2012/0042281 A1 * 2/2012 Green ..................... G06F 9/454 715/810
2012/0118976 A1 5/2012 Debski
2012/0271619 A1 * 10/2012 Abdel-Kader ........ G06F 40/109 704/3
2012/0271725 A1 10/2012 Cheng
2013/0124186 A1 * 5/2013 Donabedian .......... H04L 67/025 704/2
2013/0144674 A1 * 6/2013 Kim ................... G06Q 30/0207 705/7.19
2013/0217377 A1 * 8/2013 Yu ..................... H04M 1/72457 455/418
2013/0253901 A1 * 9/2013 Krack ..................... G06F 40/58 704/2
2013/0282360 A1 * 10/2013 Shimota .................. G06F 40/58 704/7
2013/0288633 A1 * 10/2013 Lemberg ............. H04L 67/2823 455/404.1
2013/0311918 A1 * 11/2013 McCoy ..................... G06F 8/38 715/765
2013/0325435 A1 * 12/2013 Hawkins ................. G06F 9/454 704/8
2014/0006198 A1 1/2014 Daly
2014/0172407 A1 * 6/2014 Eden ....................... G06F 40/42 704/2
2014/0195218 A1 * 7/2014 Takaoka ................. G06Q 30/02 704/2
2014/0257788 A1 * 9/2014 Xiong .................. H04N 21/441 704/8
2014/0339296 A1 * 11/2014 McAdams .......... G06F 16/9554 235/375
2015/0005987 A1 * 1/2015 Khorsheed ........... G06K 7/1417 701/2
2015/0193553 A1 * 7/2015 Petersen ............... G06F 21/316 235/375
2015/0269565 A1 * 9/2015 Inotay .............. G06K 19/06037 235/380
2015/0358787 A1 12/2015 Huang
2015/0370786 A1 * 12/2015 Kwon ..................... G06F 40/58 704/2
2016/0203126 A1 * 7/2016 Zhu ...................... G06K 7/1439 704/3

FOREIGN PATENT DOCUMENTS

| | | |
|---|---|---|
| GB | 2283850 | 5/1995 |
| JP | 2009098974 | 5/2009 |
| KR | 20100053707 | 5/2010 |
| WO | 2008064909 | 6/2008 |
| WO | 2010135263 | 11/2010 |
| WO | 2014001937 | 1/2014 |

OTHER PUBLICATIONS

Rouillard. "Contextual QR Codes", 50-55, Jul. 2008, http://www.lifl.fr/-rouillar/publi/2008_Rouillard_ICCGI.pdf, entire document.
Carzaniga et al., "Designing Distributed Applications With Mobile Code Paradigms", 22-32, May 1997, http://sei.pku.edu.cn/-yaoguo/PhDReading07/carzaniga-icse19.pdf, entire document.
Johnston et al., "Electronic Data Interchange Using Two Dimensional Bar Code", 83-91, Jan. 1998, http://www.computer.org/csdl/proceedings/hicss/1998/8242/04/82420083.pdf.
Ibrahim et al., "Steganography Algorithm to Hide Secret Message Inside an Image", 102-108, Dec. 2011, http://arxiv.org/pdf/1112.2809.
Anonymous, "EnvoyWorldWide Unveils Intelligent and Interactive Messaging Capabilities at DEMO 2001," Business Wire, Feb. 2001.

* cited by examiner

PHRASE MAPPING TABLE 300

| OPTICAL CODE IDENTIFIER | PHRASE IN LANGUAGE 1 | ○○○ | PHRASE IN LANGUAGE N |
|---|---|---|---|
| OCID 302 | PHRASE 312 | ○○○ | PHRASE 314 |
| ○○○ | | | |
| OCID 304 | PHRASE 322 | ○○○ | PHRASE 324 |

FIG. 3A

LANGUAGE TABLE 352

| OPTICAL CODE IDENTIFIER | PHRASE |
|---|---|
| OCID 302 | PHRASE 312 |
| ○○○ | |
| OCID 304 | PHRASE 322 |

○○○

LANGUAGE TABLE 354

| OPTICAL CODE IDENTIFIER | PHRASE |
|---|---|
| OCID 302 | PHRASE 314 |
| ○○○ | |
| OCID 304 | PHRASE 324 |

FIG. 3B

DISPLAYING INFORMATION IN MULTIPLE LANGUAGES BASED ON OPTICAL CODE READING

RELATED APPLICATION

This application is a continuation application of U.S. application Ser. No. 14/994,099, titled "Displaying Information in Multiple Languages based on Optical Code Reading," by inventor Yifeng Zhu, filed 12 Jan. 2016, which claims the benefit and right of priority of Chinese Patent Application No. 201510016728.8, filed 13 Jan. 2015, under 35 U.S.C. § 119.

BACKGROUND

Field

The present invention relates to the technical field of data processing, and in particular, relates to a method and system for displaying information in one or more languages based on optical code reading.

Related Art

With the development of information technology, information globalization has become a mainstream trend in various countries and regions around the world. At present, users may receive information in different languages from different sources (e.g., the Internet, television programs, advertisements, etc.). Language translator applications are emerging for allowing the users to understand the receiving information in a language of their preference (which can also be referred to as the target language).

Typically, when needed, translator applications provide translations based on image scanning. When a user observes a phrase in an unknown language, the user obtains an image of the text of the phrase (e.g., using a cell phone) and provides the image to the translator application. The translator application extracts the textual information from the image based on an image identification technology and translates the information to a target language.

However, a number of issues can arise from translation based on scanned images. For example, the original text can include a large number of characters, and a portion of the original text may fall outside of the scanning range. As a result, the portion of text that falls outside of the scanning range may not be scanned, leading to information loss and incomplete translation. In addition, the scanning process requires higher precision; if the original text is blurred or displayed in a special font, the original text can be difficult to scan and identify. Furthermore, the optical character recognition (OCR) may lead to erroneous character recognition of the original text.

SUMMARY

One embodiment of the present invention provides a system for facilitating information in multiple languages based on an optical code. During operation, the system scans an optical code accompanying a text phrase and receives a location of a conversion server embedded in the optical code. The system then determines one or more target languages for obtaining the text phrase in the target languages and sends a query message to the conversion server based on the retrieved location. The query message comprises a list of the one or more target languages.

In a variation of this embodiment, the query message further comprises an optical code identifier uniquely identifying the text phrase.

In a further variation, the optical code identifier is a digital object identifier (DOI).

In a variation of this embodiment, the system receives from the conversion server a response message comprising one or more target phrases and displays the target phrases in a display screen of the system. These target phrases are the text phrase in the target languages.

In a further variation, one or more of the target phrases are in an image format.

In a variation of this embodiment, the system identifies one or more target phrases embedded in the optical code and displays the target phrases in a display screen of the system. These target phrases are the text phrase in the target languages.

In a further variation, the system is precluded from constructing the query message.

In a further variation, the system determines whether the query message should be generated based on a user preference. The target languages in the query message are distinct from the target language embedded in the optical code.

In a variation of this embodiment, one of the one or more target languages is a default language associated with the system.

In a variation of this embodiment, the system determines one or more target languages by translating the text phrase into a first target language from the list of one or more target languages.

One embodiment of the present invention provides a system for facilitating information in multiple languages based on an optical code. During operation, the system receives from a user device a query message comprising a list of one or more target languages for obtaining a text phrase in the target languages. The system retrieves one or more target phrases from one or more data structures stored in a local storage device. These target phrases are the text phrase in the target languages. The system then sends to the user device a response message comprising the one or more target phrases.

In a variation of this embodiment, the one or more data structures are database tables. The system then retrieves the one or more target phrases by generating a database query based on information received from the query message obtaining the target phrases by applying the database query to the database tables.

In a further variation, the target phrases are mapped to an optical code identifier uniquely identifying the text phrase in the database tables.

In a variation of this embodiment, if the system determines an unavailability of text support for a target language, the system converts the target phrase of the target language to an image format.

BRIEF DESCRIPTION OF THE DRAWINGS

The accompanying drawings herein, which are incorporated herein and constitute a part of the specification, illustrate several exemplary embodiments of the present application and together with the description serve to illustrate the present application, construing no limitation to the present application. In the drawings:

FIG. 3A illustrates an exemplary table mapping an optical code identifier to a phrase in one or more languages, in accordance with an embodiment of the present application.

FIG. 3B illustrates exemplary tables mapping an optical code identifier to a phrase in one or more languages based on a corresponding intermediate phrase identifier, in accordance with an embodiment of the present application.

In the figures, like reference numerals refer to the same figure elements.

DETAILED DESCRIPTION OF EMBODIMENTS

Embodiments of the present invention solve the problem of facilitating information in one or more target languages by scanning an optical code associated with a phrase and retrieving the phrase in the target language based on the scanned code. When a user travels to another country, the signs in that country can be in a language the user is unfamiliar with. If the user wishes to obtain the information of the sign in a preferred language, the user can use a translator application to obtain the information in the target language.

With existing technologies, the target language is typically a single language. If a user wishes to obtain the phrase in multiple languages, the user provides the phrase multiple times to a translator application. Typically, the translator application receives an image of the phrase in the original language, applies OCR to the image to obtain the text of the phrase, and translates the text. However, this process can lead to an incomplete scan, leading to information loss and incomplete translation. In addition, if the original text is not visually clear, the scanned text may not be recognizable. Furthermore, the OCR process can be erroneous and lead to incorrect character recognition.

To solve this problem, embodiments of the present invention provide a conversion system that scans an optical code and provides a phrase associated with the optical code in one or more languages. This optical code can accompany a notice on a sign. The conversion system can include a conversion application and a conversion server. During operation, a user scans the optical code via an optical apparatus (e.g., a camera on a cell phone) using a scanning interface of a conversion application. The scanning interface can be part of a user interface of an app running on the cell phone. The conversion application then presents a selection interface with a list of target languages (i.e., the list of languages the phrase is available in). The user selects one or more target languages from the selection interface.

The conversion application retrieves an optical code identifier and a location of the conversion server embedded in the optical code. This location can be a uniform resource locator (URL). The conversion application then sends a query message with the optical code identifier and the list of target languages to the conversion server based on the retrieved location. Upon receiving the query message, the conversion server obtains the phrase mapped to the optical code identifier in the target languages from one or more local tables. The conversion server then sends a response message with the phrase in the target languages to the conversion application. Upon receiving the response message, the conversion application displays the phrase in the target languages to the user. In this way, the conversion system provides an efficient way to display information in multiple languages using optical codes.

Figure 1A:
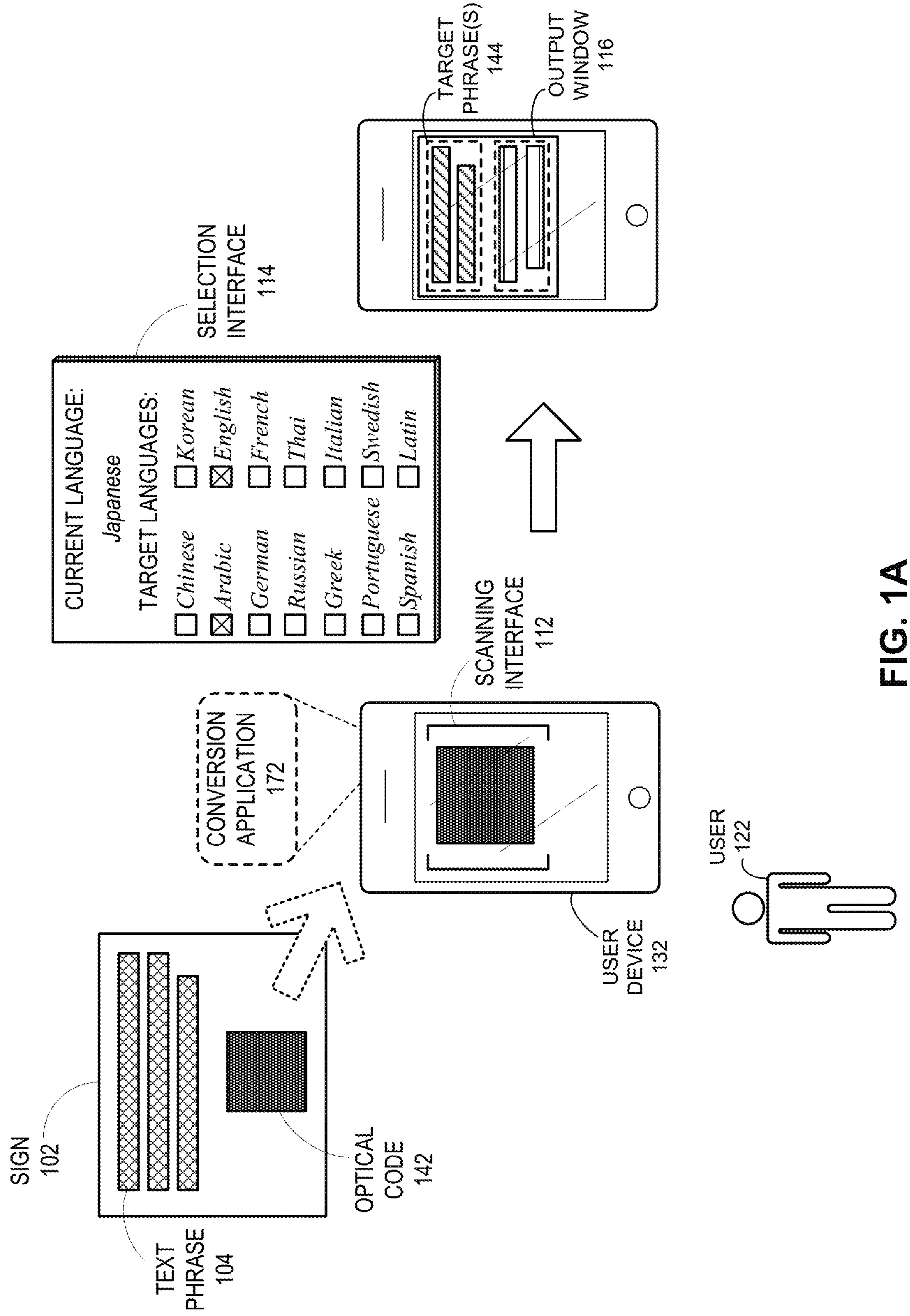
FIG. 1A illustrates an exemplary conversion application displaying a phrase to a user in a plurality of target languages based on an optical code, in accordance with an embodiment of the present application.

FIG. 1A illustrates an exemplary conversion application displaying a phrase to a user in a plurality of target languages based on an optical code, in accordance with an embodiment of the present application. Suppose that a user 122 comes across a sign 102 with a notice. The notice can include text phrase 104, which is in a language user 122 does not understand (e.g., cannot read). If user 122 carries a user device 132 (e.g., a cell phone), user 122 can use user device 132 to obtain a translation of phrase 104.

With existing technologies, user 122 obtains an image of phrase 104 using a camera of user device 132 and provides the image to a language translator application. Typically, the translator application applies OCR to the image to obtain the text of phrase 104 from the image and translates the text. However, the OCR process can be erroneous and lead to incorrect character recognition. In addition, if a portion of the image falls out of the range of the camera of user device 132, the translation process can suffer information loss. In addition, if the original text of phrase 104 is not visually clear (e.g., has dirt on it or has become blurry or chipped over time), the OCR process may not be able to recognize phrase 104. Furthermore, if user 122 wishes to obtain the phrase in multiple languages, user 122 usually provides the phrase multiple times to the translator application.

To solve this problem, user 122 uses a conversion system to obtain phrase 104 in one or more target languages by scanning an optical code 142 in sign 102. The conversion system can include a conversion application 172, which runs on user device 132, and a conversion server, which can be accessible via a wide area network, such as the Internet. In some embodiments, optical code 142 is a digital object identifier (DOI). A DOI is a unique alphanumeric string, which identifies a content and provides a location of the content (e.g., a URL). A DOI can be represented as an optical code. Examples of a DOI optical code include, but are not limited to, a barcode and a multi-dimensional code (e.g., a two-dimensional (2D) optical code). Since different sites can host different conversion servers, the location of a conversion server can be embedded in optical code 142. For example, the National Park Service of the United States of America (USA) and the National Parks of Japan can host conversion servers for the signs in the national parks in the USA and Japan, respectively. In some embodiments, one of the target languages can be a default language associated with conversion application 172. Conversion application 172 can also determine the target languages by translating the text phrase into a first target language from the list of one or more target languages.

During operation, when user 122 observes sign 102 in an unfamiliar language, user 122 scans optical code 142 using a scanning interface 112 of conversion application 172. User device 132 can be equipped with one or more optical apparatus capable of scanning the code, such as a camera and a code scanner. Scanning interface 112 can use these optical apparatus to scan code 142. Conversion application 172 then presents a selection interface 114 with a list of target languages (i.e., the list of languages the phrase is available in) to user 122. Selection interface 114 can also state the current language of the phrase. User 122 then selects one or more target languages from selection interface 114.

Conversion application 172 also retrieves an optical code identifier and a location of the conversion server embedded in optical code 142. The optical code identifier uniquely identifies optical code 142 and can be a DOI. The location of the conversion server can include one or more of: a URL, a media access control (MAC) address, and an Internet Protocol (IP) address. Conversion application 172 then obtains one or more target phrases 144 from the conversion server using the optical code identifier and the list of target languages. Target phrases 144 are phrase 104 in the target languages. Conversion application 172 can display target phrases 144 to user 122 in an output window 116. If the text of a target phrase is not supported, conversion application 172 can display an image of the text of the phrase, which can be generated locally or at the conversion server, in output window 116. In this way, user 122 uses the conversion system to obtain information in multiple languages using optical codes in an efficient way.

Figure 1B:
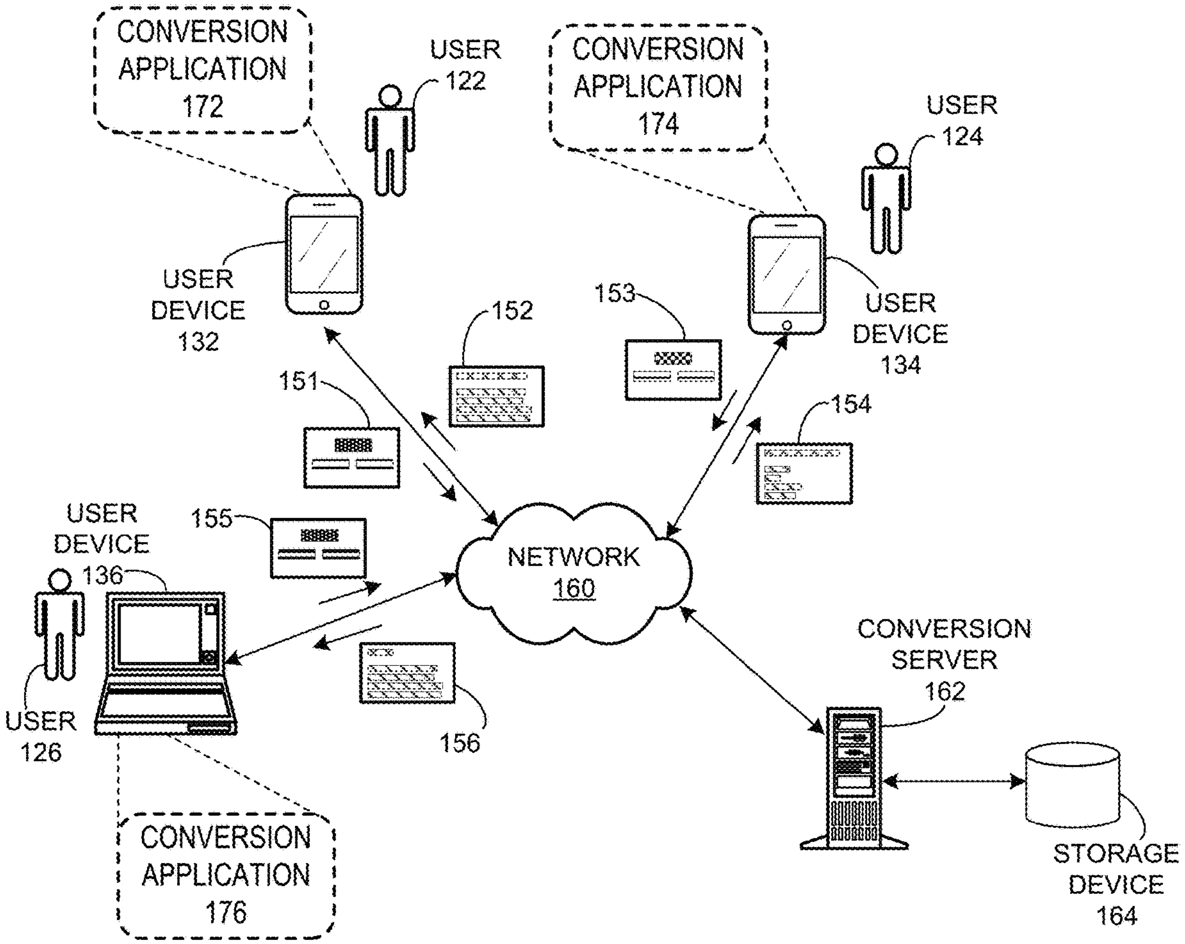
FIG. 1B illustrates an exemplary distributed conversion system providing a phrase to a user in a plurality of target languages based on an optical code, in accordance with an embodiment of the present application.

FIG. 1B illustrates an exemplary distributed conversion system providing a phrase to a user in a plurality of target languages based on an optical code, in accordance with an embodiment of the present application. In this example, the conversion system includes a conversion server 162. A plurality of users 122, 124, and 126 use user devices 132, 134, and 136, respectively, which are coupled to conversion server 162 via a network 160. Examples of network 160 include, but are not limited to, a local area network (LAN), a virtual LAN (VLAN), and a wide area network (WAN). Examples of a user device include, but are not limited to, a cell phone, a tablet, a personal organizer, a laptop, and any type of portable computing device equipped with one or more optical apparatus.

As described in conjunction with FIG. 1A, conversion application 172 retrieves the optical code identifier and the location of conversion server 162 embedded in optical code 142. Conversion application 172 then sends a query message 151 with the optical code identifier and the list of target languages to conversion server 162 based on its location via network 160. Upon receiving query message 151, conversion server 162 obtains the target phrases mapped to the optical code identifier in query message 151 from one or more local tables stored in local storage device 164. Conversion server 162 then sends a response message 152 with the target phrases (e.g., target phrases 144 in FIG. 1A) to conversion application 172. Upon receiving response message 152, conversion application 172 displays the target phrases to user 122.

In this example, query message 151 and response message 152 are network messages (e.g., frames, packets, or cells). The optical code identifier, target languages, and target phrases can be carried in the payload of these network messages. Query message 151 can include the target languages by name. Query message 151 can also include a language identifier mapped to a target language. For example, conversion application 172 and conversion server 162 can maintain a mapping between a language name and a corresponding language identifier. If a target language is "English," conversion application 172 obtains the corresponding language identifier from the mapping and includes it in query message 151. Upon receiving query message 151, conversion server 162 determines the target languages based on the mapping and the language identifiers in query message 151.

In this example, users 122 and 126 scan the same optical code 142 using conversion applications 172 and 176, respectively. However, depending on the selection from user 126, query message 155 from conversion application 176 can have a different list of target languages. As a result, response message 156 from conversion server 162 can include a different set of target phrases. Upon receiving response message 156, conversion application 176 displays the target phrases to user 126. The same conversion server 162 can serve different optical codes. For example, user 124 can scan a different optical code using user device 134. Here, the optical code identifier can be different because of a different original language or a different text phrase. Conversion application 174 retrieves a different optical code identifier and the location of conversion server 162 embedded in that optical code.

Conversion application 174 then sends a query message 153 with the optical code identifier and the list of target languages to conversion server 162. Upon receiving query message 153, conversion server 162 obtains the target phrases mapped to the optical code identifier in query message 153 from one or more local tables stored in local storage device 164. Conversion server 162 then sends a response message 154 with the target phrases to conversion application 174. Upon receiving response message 154, conversion application 174 displays the target phrases to user 124. In this way, a conversion system provides information in multiple languages using at least one conversion server and one or more conversion applications running on different user devices.

Figure 2:
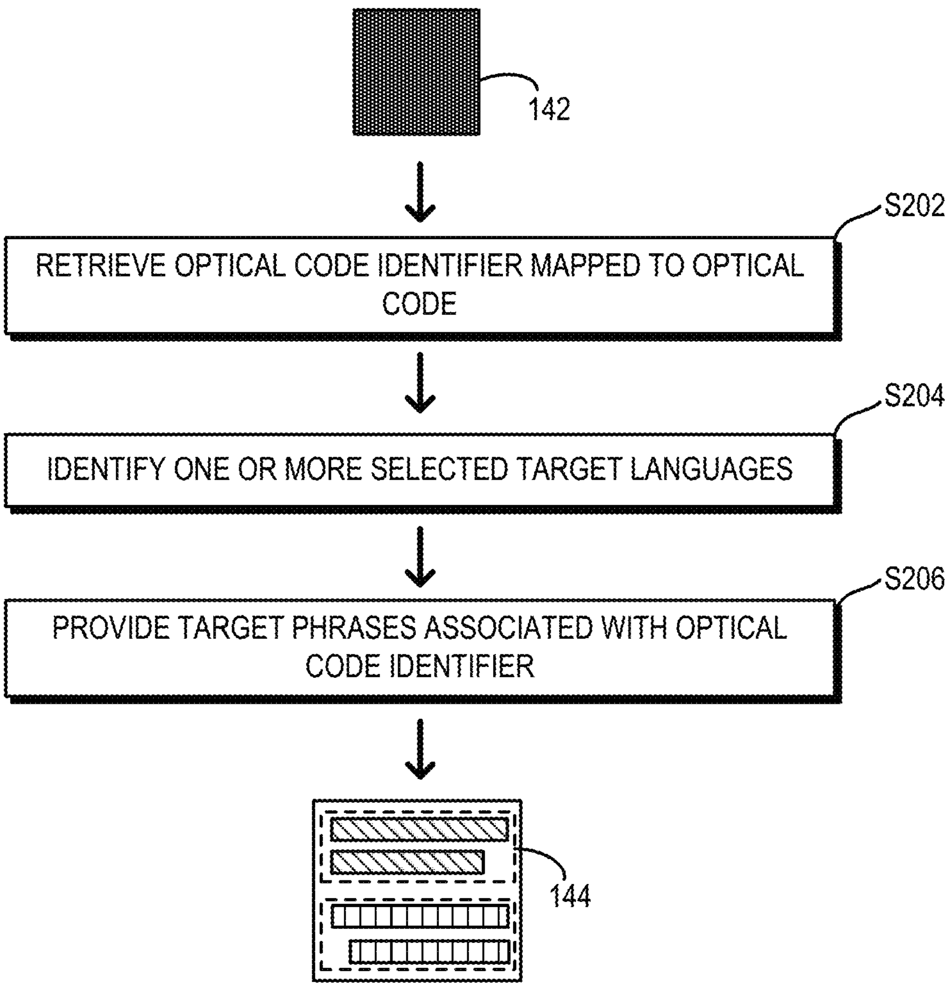
FIG. 2 illustrates an exemplary process of a conversion system retrieving a phrase in one or more target languages based on an optical code, in accordance with an embodiment of the present application.

FIG. 2 illustrates an exemplary process of a conversion system retrieving a phrase in one or more target languages based on an optical code, in accordance with an embodiment of the present application. During operation, the conversion system retrieves the optical code identifier mapped to optical code 142 (operation S202). The conversion system identifies one or more selected target languages (operation S204). The conversion system then provides the target phrases 144 associated with the optical code identifier to a user (operation S206), as described in conjunction with FIG. 1B.

FIG. 3A illustrates an exemplary table mapping an optical code identifier to a phrase in one or more languages, in accordance with an embodiment of the present application. A phrase mapping table 300 includes one or more entries, each entry mapping an optical code identifier to the target phrases in a plurality of languages. For example, an entry in table 300 maps an optical code identifier 302 to the target phrases in a number of languages, such as phrase 312 in language 1 to phrase 314 in language N. In the same way, another entry in table 300 maps an optical code identifier 304 to the target phrases in a number of languages, such as phrase 322 in language 1 to phrase 324 in language N.

It should be noted that these two entries may not include a phrase in the same language. For example, optical code identifier 302 can be mapped to a phrase in a language, which is unavailable for optical code identifier 304. Table 300 can use a special value (e.g., "0000") for that field, indicating unavailability of that target phrase in that language. To allow a user to properly select the target languages, the optical code associated with an optical code identifier can embed a list of available languages. When the user scans the optical code, that list of available languages is provided as the selection options in the selection interface.

Since table 300 includes the phrases for a large number of languages, table 300 can become large and inefficient. Hence, a conversion system can maintain separate tables for separate languages. FIG. 3B illustrates exemplary tables mapping an optical code identifier to a phrase in one or more languages based on a corresponding intermediate phrase identifier, in accordance with an embodiment of the present application. Here, the conversion system maintains a number of tables for a respective language, such as language table 352 for language 1 to language table 354 for language N. Table 352 maps optical code identifiers 302 and 304 to corresponding phrases 312 and 322, respectively, in language 1. Similarly, table 354 maps optical code identifiers 302 and 304 to corresponding phrases 314 and 324, respectively, in language N.

Tables 352 and 354 can be identified by an identifier, which can be the name of the language (e.g., "English" or "Japanese") or an alphanumeric value mapped to the name of the language. Different conversion servers can implement different tables to implement the mappings. For example, one conversion server can use table 300 for the mapping while another conversion server can use tables 352 and 354 for the mapping. This allows different sites to implement the mapping in different ways.

In some embodiments, tables 300, 352, and 354 can be database tables. Hence, the conversion system uses a database query (e.g., Structured Query Language (SQL) query) to retrieve information from tables 300, 352, and 354. This database query can be generated by the conversion application or the conversion server. However, if the same conversion application is used to communicate with a plurality of conversion servers, the database query can be generated by the conversion server. In the example in FIG. 1B, upon receiving query message 151 from conversion application 172, conversion server 162 retrieves the optical code identifier of code 142 and the list of target languages from query message 151. Conversion server 162 then constructs a SQL query using the retrieved information and applies the SQL query to the database tables in storage device 164 to obtain the target phrases.

Figure 4A:
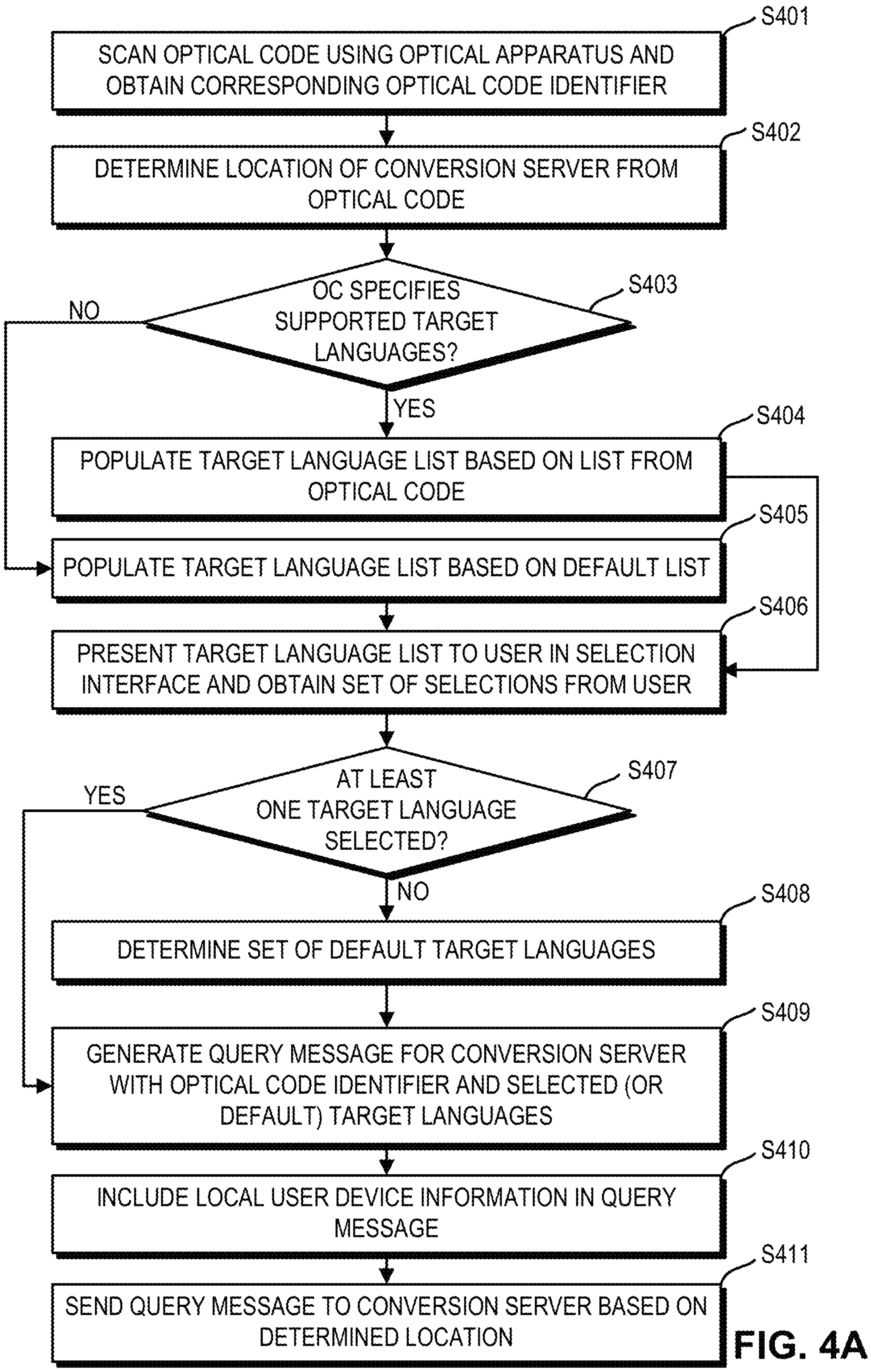
FIG. 4A presents a flowchart illustrating the process of a conversion application retrieving a phrase in one or more target languages, in accordance with an embodiment of the present application.

FIG. 4A presents a flowchart illustrating the process of a conversion application retrieving a phrase in one or more target languages, in accordance with an embodiment of the present application. During operation, the conversion application scans an optical code using an optical apparatus (e.g., a camera) and obtains the corresponding optical code identifier (operation S401). The conversion application also determines the location of a conversion server from the optical code (operation S402). In some embodiments, the optical code identifier and/or the location of the conversion server is embedded in the optical code. The conversion application then checks whether the optical code specifies the supported target languages (operation S403).

If the optical code specifies the supported target languages, the conversion application populates a list of target languages, which can be referred to as a target language list, based on the list from the optical code (operation S404). Otherwise, the conversion application populates a target language list based on a default list (operation S405). Upon populating the target language list, the conversion application presents the target language list to the user in a selection interface and obtains a set of selections from the user (operation S406). The conversion application then checks whether the user has selected at least one target language (operation S407).

If the user has not selected at least one target language, the conversion application determines a set of default target languages (operation S408). The conversion application can generate the set of default target languages based on a default location of the user (e.g., using a position tracker, such as the Global Positioning System (GPS) or triangulation). For example, if the user is from the USA, the default target language can be English (and Spanish). Upon the determination of the default target languages or if the user has selected at least one target language, the conversion application generates a query message for the conversion server with the optical code identifier and the selected (or default) target languages (operation S409). The query message can include target languages by name or language identifiers mapped to the target languages.

In some embodiments, the conversion application also includes local user device information in the query message (operation S410). The local user device information includes, but is not limited to, a MAC address and/or an IP address of the local user device, and an indication whether the text (e.g., font) of a language is supported by the device. The conversion application can provide unicode-based font support for different languages to the user device. The conversion application then sends the query message to the conversion server based on the determined location (operation S411).

Figure 4B:
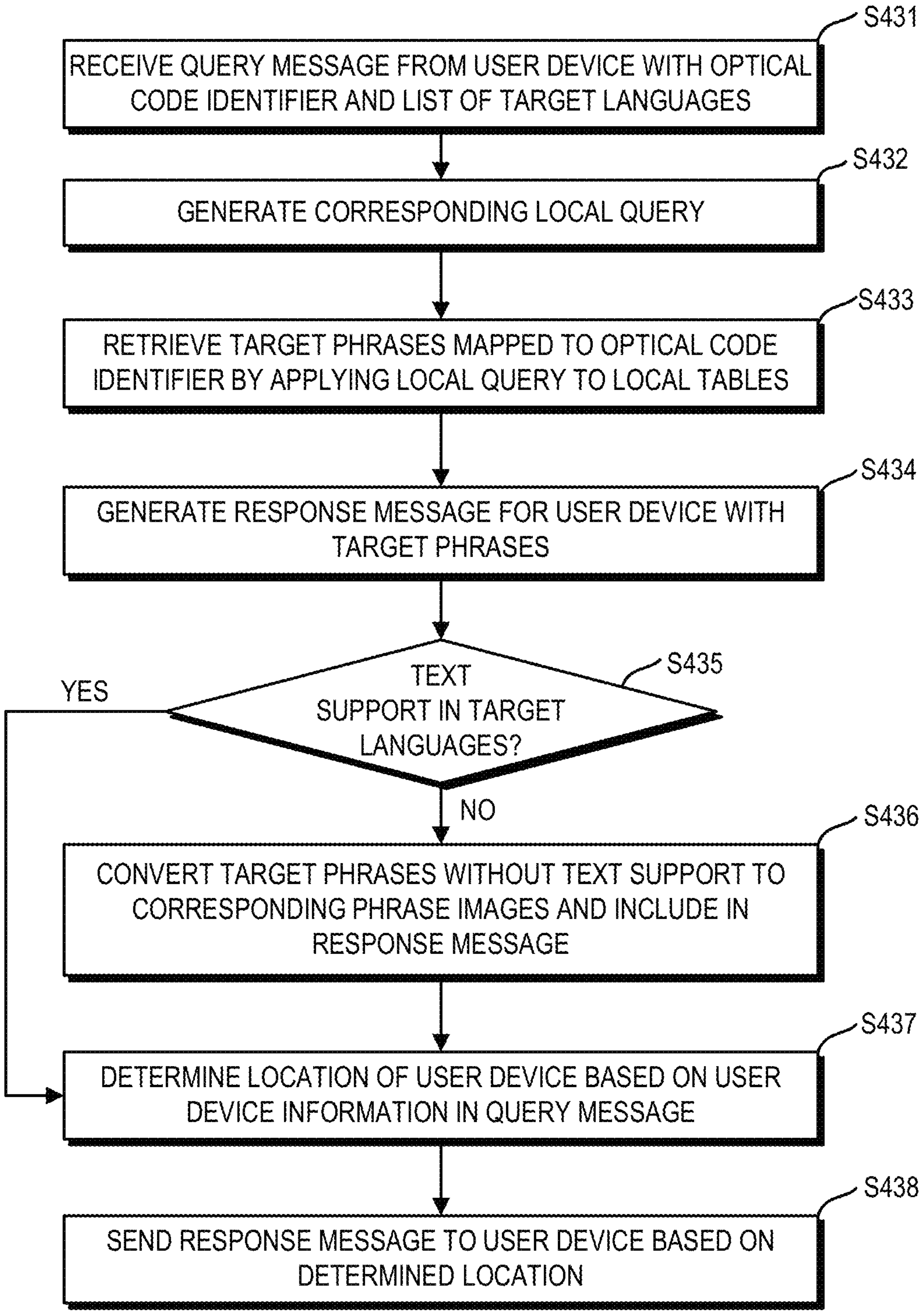
FIG. 4B presents a flowchart illustrating the process of a conversion server providing a phrase in one or more target languages, in accordance with an embodiment of the present application.

FIG. 4B presents a flowchart illustrating the process of a conversion server providing a phrase in one or more target languages, in accordance with an embodiment of the present application. During operation, the conversion server receives a query message from the user device with the optical code identifier and a list of target languages (operation S431) and generates a corresponding local query (e.g., a database query) (operation S432). The conversion server then retrieves the target phrases mapped to the optical code identifier by applying the local query to the local tables (operation S433), as described in conjunction with FIGS. 3A and 3B.

The conversion server generates a response message for the user device with the target phrases (operation S434). These target phrases can be expressed in one or more unicode-based fonts. The response message can also include the phrase in the original language. The conversion server then checks whether the user device supports text (e.g., a font) in the target languages (operation S435). The conversion server can use the user device information in the query message for this determination.

If the user device does not support text in one or more target languages, the conversion server converts the target phrases without text support to corresponding phrase images and includes the phrase images in the response message (operation S436). Upon the conversion or if the user device supports text in the target languages, the conversion server determines a location of the user device based on the user device information in the query message (operation S437). The conversion server then sends the response message to the user device based on the determined location (operation S438).

Figure 4C:
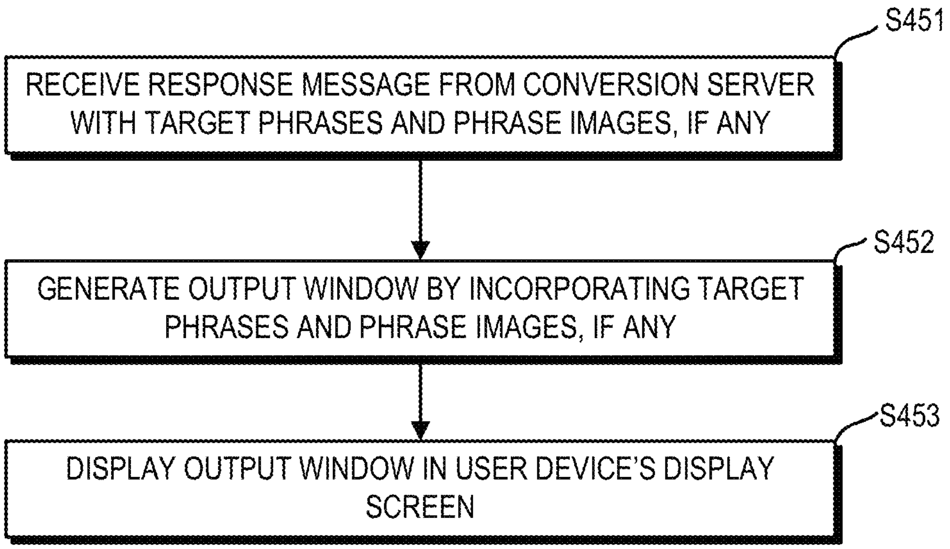
FIG. 4C presents a flowchart illustrating the process of a conversion application obtaining and displaying a phrase in one or more target languages in a user device, in accordance with an embodiment of the present application.

FIG. 4C presents a flowchart illustrating the process of a conversion application obtaining and displaying a phrase in one or more target languages in a user device, in accordance with an embodiment of the present application. During operation, the conversion application receives a response message from the conversion server with the target phrases and phrase images, if any (operation S451). The conversion application generates an output window by incorporating the target phrases and the phrase images, if any (operation S452). This incorporation can include alignment and placement of texts and images. The output window can also include the phrase in the original language. The conversion application then displays the output window in the user device's display screen (operation S453) (e.g., a cell phone screen).

Figure 5A:
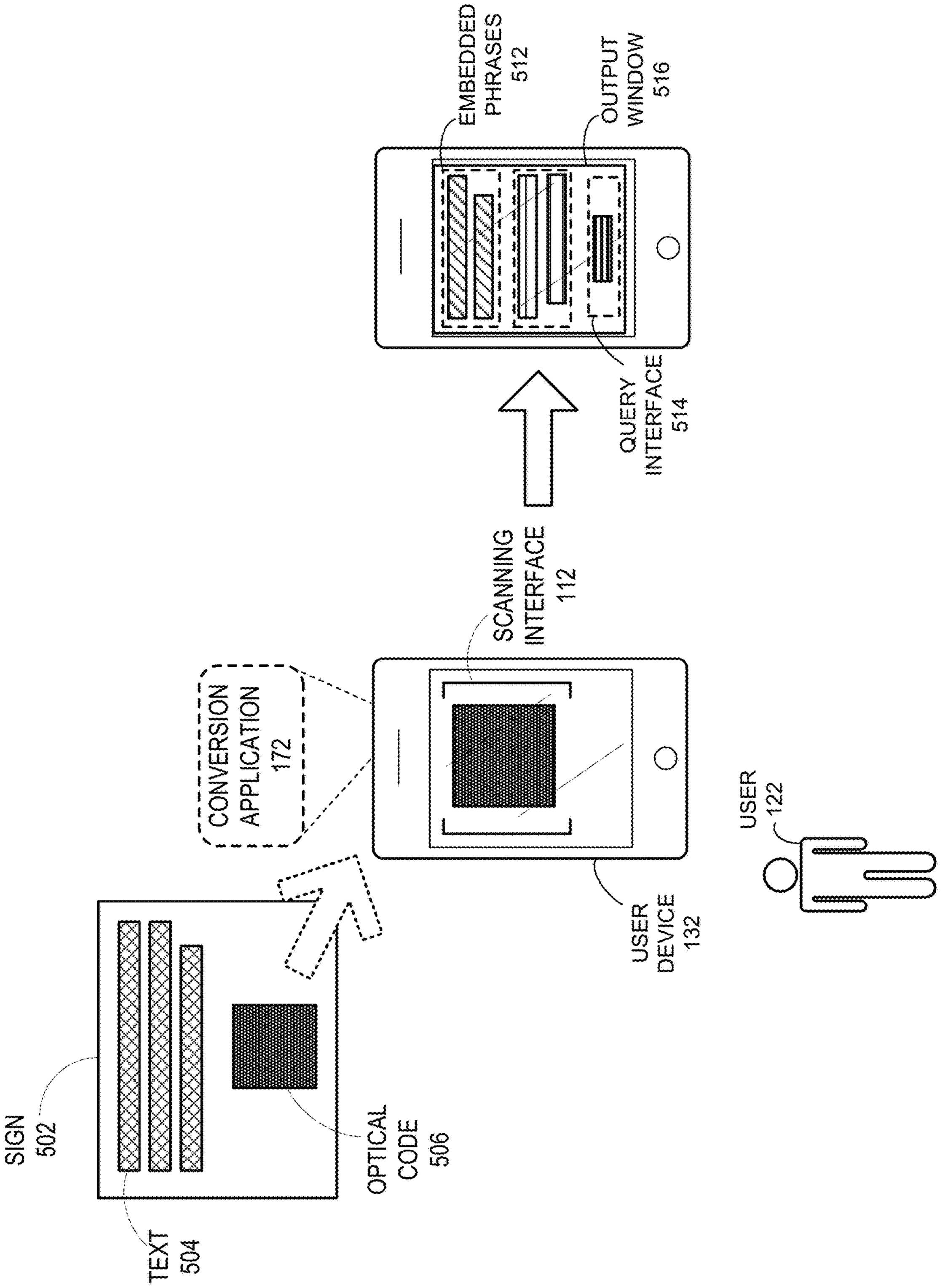
FIG. 5A illustrates an exemplary conversion application displaying an integrated phrase from an optical code to a user in a plurality of target languages, in accordance with an embodiment of the present application.

FIG. 5A illustrates an exemplary conversion application displaying an integrated phrase from an optical code to a user in a plurality of target languages, in accordance with an embodiment of the present application. Suppose that user 122 comes across another sign 502 with a notice. The notice can include a text phrase 504, which is in a language unfamiliar to user 122 (e.g., which user 122 cannot read). User 122 can use user device 132 to obtain a translation of phrase 504. User 122 uses conversion application 172 to obtain phrase 504 in one or more target languages by scanning an optical code 506 in sign 502.

During operation, when user 122 observes sign 502 in an unfamiliar language, user 122 scans optical code 506 using a scanning interface 112 of conversion application 172. If phrase 504 is short, the information volume for phrase 504 can be small enough to be embedded in optical code 506. Under such circumstances, one or more target phrases of phrase 504 can be embedded in optical code 506. These target phrases can be referred to as embedded phrases. When user 122 scans optical code 506, conversion application 172 retrieves embedded phrases 512 and displays embedded phrases 512 in output window 516. In this way, the conversion system can avoid network traffic and provides a quick response.

In some embodiments, if embedded phrases 512 are also unfamiliar to user 122, conversion application 172 also provides additional selection options. Under such circumstances, output window 516 also includes a query interface 514. If user 122 wishes to receive additional selection options, user 122 can use query interface 514 to launch a selection interface, which allows user 122 to select one or more target languages, as described in conjunction with FIG. 1A. In some embodiments, query interface 514 includes a button, the touching (or clicking) of which launches the selection interface. Conversion application 172 then obtains the target phrases from conversion server 162, as described in conjunction with FIG. 1B.

Figure 5B:
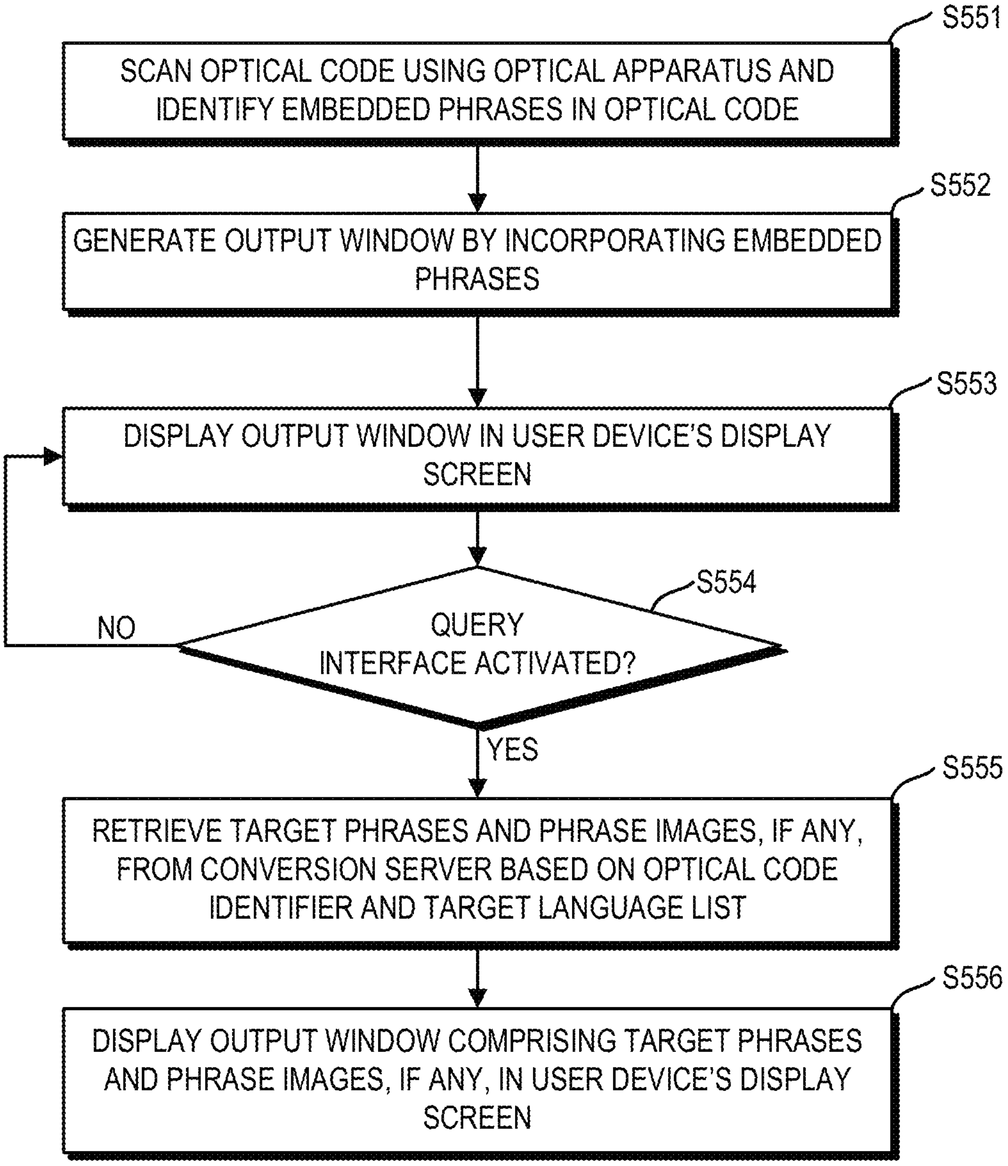
FIG. 5B presents a flowchart illustrating the process of a conversion application displaying an integrated phrase from an optical code to a user in a plurality of target languages, in accordance with an embodiment of the present application.

FIG. 5B presents a flowchart illustrating the process of a conversion application displaying an integrated phrase from an optical code to a user in a plurality of target languages, in accordance with an embodiment of the present application. During operation, the conversion application scans an optical code using an optical apparatus and identifies the embedded phrases in the optical code (operation S551). The conversion application generates an output window by incorporating the embedded phrases (operation S552) and displays the output window in the user device's display screen (operation S553). The conversion application then checks whether the query interface has been activated by a user (operation S554). The query interface can be activated by touching (or clicking) a button in the query interface.

If the query interface has not been activated, the conversion application continues to display the output window in the user device's display screen (operation S553). On the other hand, if the query interface has been activated, the conversion application retrieves the target phrases and phrase images, if any, from the conversion server based on the optical code identifier and the target language list (operation S555), as described in conjunction with FIGS. 4A and 4B. The conversion application then displays an output window comprising the target phrases and the phrase images, if any, in the user device's display screen (operation S556), as described in conjunction with FIGS. 4B and 4C.

Exemplary Apparatus

Figure 6:
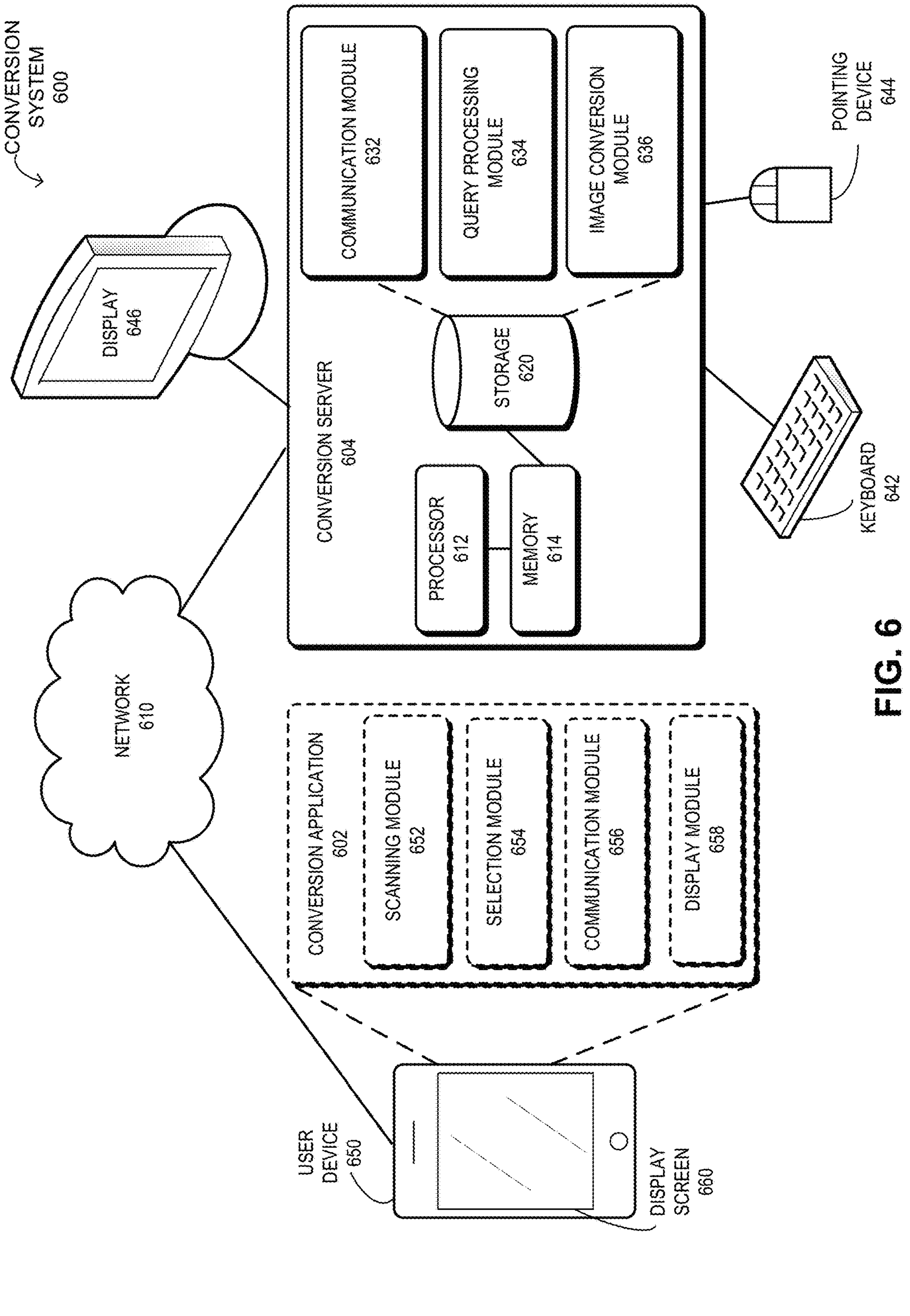
FIG. 6 is a schematic structural diagram of an exemplary conversion system, in accordance with an embodiment of the present application.

FIG. 6 is a schematic structural diagram of an exemplary conversion system, in accordance with an embodiment of the present application. A conversion system 600 can be used for providing information in multiple languages based on scanning an optical code. Conversion system 600 can include a conversion application 602 running on a user device 650 and a conversion server 604 (e.g., a computing device).

Server 604 includes a processor 612, a memory 614, and a storage device 620. Storage device 620 typically stores instructions that can be loaded into memory 614 and executed by processor 612 to perform the methods described above. In one embodiment, the instructions in storage 620 of server 604 can implement a communication module 632, a query processing module 634, and an image conversion module 636, all of which can communication with each other through various means.

In some embodiments, modules 632, 634, and 636 can be partially or entirely implemented in hardware and can be part of processor 612. Further, in some embodiments, server 604 may not include a separate processor and memory. Instead, in addition to performing their specific tasks, modules 632, 634, and 636, either separately or in concert, may be part of special-purpose computation engines.

Storage device 620 stores programs to be executed by processor 612. Specifically, storage device 620 stores a program that implements a server (e.g., a server application) for facilitating target phrases to a user device. During operation, the application program can be loaded from storage device 620 into memory 614 and executed by processor 612. As a result, server 604 can perform the functions described above. Server 604 can be further coupled to an optional display 646, a keyboard 642, and a pointing device 644, and can be coupled via one or more network interfaces to a network 610.

During operation, communication module 632 receives a query message from user device 650, and obtains an optical code identifier and a list of target languages. Query processing module 634 generates a local query (e.g., a database query) and applies the local query to one or more local tables (e.g., database tables) stored in storage device 620. In this way, query processing module 634 obtains one or more target phrases. If the query message indicates that the text of a target phrase is not supported by user device 650, image conversion module 636 converts the text of that target phrase to a phrase image. Communication module 632 then generates a response message comprising one or more target phrases, and the phrase images, if any, for user device 650.

In some embodiments, user device 650 includes a processor, a memory, and a storage device (not shown in FIG. 6). User device 650 further includes a conversion application 602 comprising a scanning module 652, a selection module 654, a communication module 656, and a display module 658, all of which can communication with each other through various means. In some embodiments, modules 652, 654, 656, and 658 can be partially or entirely implemented in hardware and can be part of a processor in user device 650. Further, in some embodiments, in addition to performing their specific tasks, modules 652, 654, 656, and 658, either separately or in concert, may be part of special-purpose computation engines.

During operation, conversion application 602 can be loaded from a storage device into a memory and executed by a processor in user device 650. As a result, conversion application 602 can perform the functions described above. Scanning module 652 scans an optical code and retrieves information embedded in the optical code. Selection module 654 provides a selection interface comprising the choices of target languages to a user via display screen 660 of user device 650. Selection module 654 then determines one or more target languages selected by the user or from a default list. Communication module 656 generates the query message for server 604 and sends it. Communication module 656 also receives the response message from server 604 and retrieves target phrases from the response message. Display module 658 generates an output window comprising one or more target phrases, and the phrase images, if any, and displays the output window via display screen 660.

Embodiments of the present invention may be implemented on various universal or dedicated computer system environments or configurations. For example, such computer systems may include personal computers, server computers, handheld or portable devices, tablet-type devices, multiprocessor systems, microprocessor-based systems, set-top boxes, programmable electronic consumption devices, network PCs, minicomputers, mainframe computers, distributed computing environments including any of the above systems or devices, and the like.

Embodiments of the present invention may be described within the general context of computer-executable instructions executed by a computer, such as a program module. Generally, the program module includes a routine, a program, an object, an assembly, a data structure and the like for implementing particular tasks or achieving particular abstract data types. Embodiments of the present invention may also be implemented in distributed computing environments, in which tasks are performed by remote processing devices connected via a communication network. In the distributed computing environments, program modules may be located in local and remote computer storage media that may include a storage device.

The data structures and computer instructions described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The above description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

What is claimed is:

1. A computer-implemented method for facilitating information in multiple languages based on an optical code, comprising:

scanning, by a computing device, an optical code accompanying a text phrase;

retrieving a first target phrase embedded in the optical code, wherein a respective target phrase is a translation of the text phrase in a first target language;

displaying the first target phrase and a query interface on a display screen of the computing device, wherein the query interface is configured to obtain a user input for launching a selection interface;

in response to the user input via the query interface, presenting, on the display screen, the selection interface and obtaining a selection of a second target language from a set of target languages from the selection interface;

determining unavailability of text support for the second target language in the computing device;

in response to the determining, retrieving an image displaying a second target phase in the second target language; and displaying the first target phrase and the image displaying the second target phrase on the display screen of the computing device.

2. The method of claim 1, further comprising, in response to the user input via the query interface:

identifying a location of a conversion server and an optical code identifier embedded in the optical code obtained from the scanning operation, wherein the optical code identifier corresponds to a set of target phrases corresponding to the set of target languages in the conversion server; and selecting, by the computing device, the second target language from the set of target languages for obtaining the text phrase in the second target language.

3. The method of claim 2, wherein retrieving the second target phase further comprises:

sending a query message to the conversion server based on the retrieved location, wherein the query message comprises the optical code identifier and the second target language; and receiving, from the conversion server, a response message comprising the second target phrase in the second target language.

4. The method of claim 2, wherein the optical code identifier includes a digital object identifier (DOI), which is a unique alphanumeric string 3indicating the location of the conversion server.

5. The method of claim 1, wherein the query interface is configured to obtain the user input from a button, wherein the user input on the button launches the selection interface on the display screen.

6. The method of claim 1, further comprising:

retrieving a third target phrase embedded in the optical code; and displaying, with the first and second target phases, the third target phrase on the display screen.

7. The method of claim 1, wherein a number of target phases embedded in the optical code is determined based on information volume that the optical code is capable of incorporating.

8. A non-transitory computer-readable storage medium storing instructions that when executed by a computer cause the computer to perform a method for facilitating information in multiple languages based on an optical code, the method comprising:

scanning, by a computing device, an optical code accompanying a text phrase;

retrieving a first target phrase embedded in the optical code, wherein a respective target phrase is a translation of the text phrase in a first target language;

displaying the first target phrase and a query interface on a display screen of the computing device, wherein the query interface is configured to obtain a user input for launching a selection interface;

in response to the user input via the query interface, presenting, on the display screen, the selection interface and obtaining a selection of a second target language from a set of target languages from the selection interface;

determining unavailability of text support for the second target language in the computing device;

in response to the determining, retrieving an image displaying a second target phase in the second target language; and displaying the first target phrase and the image displaying the second target phrase on the display screen of the computing device.

9. The non-transitory computer-readable storage medium of claim 8, wherein the method further comprises, in response to the user input via the query interface:

identifying a location of a conversion server and an optical code identifier embedded in the optical code obtained from the scanning operation, wherein the optical code identifier corresponds to a set of target phrases corresponding to the set of target languages in the conversion server; and selecting, by the computing device, the second target language from the set of target languages for obtaining the text phrase in the second target language.

10. The non-transitory computer-readable storage medium of claim 9, wherein the wherein retrieving the second target phase further comprises:

sending a query message to the conversion server based on the retrieved location, wherein the query message comprises the optical code identifier and the second target language; and receiving from the conversion server a response message comprising the second target phrase in the second target language.

11. The non-transitory computer-readable storage medium of claim 9, wherein the optical code identifier includes a digital object identifier (DOI), which is a unique alphanumeric string indicating the location of the conversion server.

12. The non-transitory computer-readable storage medium of claim 8, wherein the query interface is configured to obtain the user input from a button, wherein the user input on the button launches the selection interface on the display screen.

13. The non-transitory computer-readable storage medium of claim 8, wherein the method further comprises:

retrieving a third target phrase embedded in the optical code; and displaying, with the first and second target phrases, the third target phrase on the display screen.

14. The non-transitory computer-readable storage medium of claim 8, wherein a number of target phrases embedded in the optical code is determined based on information volume that the optical code is capable of incorporating.

15. A computing system for facilitating information in multiple languages based on an optical code, the computing system comprising:

a processor;

a display screen;

a memory coupled to the processor and storing instructions, which when executed by the processor cause the processor to perform a method, the method comprising:

scanning an optical code accompanying a text phrase;

retrieving a first target phrase embedded in the optical code, wherein a respective target phrase is a translation of the text phrase in a first target language;

displaying the first target phrase and a query interface on the display screen, wherein the query interface is configured to obtain a user input for launching a selection interface;

in response to the user input via the query interface, presenting, on the display screen, the selection interface and obtaining a selection of a second target language from a set of target languages from the selection interface;

determining unavailability of text support for the second target language in the computing device;

in response to the determining, retrieving an image displaying a second target phase in the second target language; and displaying the first target phrase and the image displaying the second target phrase on the display screen of the computing device.

16. The computing system of claim 15, wherein the method further comprises, in response to the user input via the query interface:

identifying a location of a conversion server and an optical code identifier embedded in the optical code obtained from the scanning operation, wherein the optical code identifier corresponds to a set of target phrases corresponding to the set of target languages in the conversion server; and selecting, by the computing device, the second target language from the set of target languages for obtaining the text phrase in the second target language.

17. The computing system of claim 16, wherein the wherein retrieving the second target phase further comprises:

sending a query message to the conversion server based on the retrieved location, wherein the query message comprises the optical code identifier and the second target language; and receiving from the conversion server a response message comprising the second target phrase in the second target language.

18. The computing system of claim 16, wherein the optical code identifier includes a digital object identifier (DOI), which is a unique alphanumeric string indicating the location of the conversion server.

19. The computing system of claim 15, wherein the query interface is configured to obtain the user input from a button, wherein the user input on the button launches the selection interface on the display screen.

20. The computing system of claim 15, wherein the method further comprises:

retrieving a third target phrase embedded in the optical code; and displaying, with the first and second target phrases, the third target phrase on the display screen.

* * * * *

UNITED STATES PATENT AND TRADEMARK OFFICE

CERTIFICATE OF CORRECTION

PATENT NO. : 11,062,096 B2
APPLICATION NO. : 16/189496
DATED : July 13, 2021
INVENTOR(S) : Yifeng Zhu It is certified that error appears in the above-identified patent and that said Letters Patent is hereby corrected as shown below:

In the Claims

Claim 04, Column 13, Line 10 “3indicating” should read “indicating”

Signed and Sealed this
Seventeenth Day of May, 2022

Katherine Kelly Vidal

Katherine Kelly Vidal
*Director of the United States Patent and Trademark Office*